(No Model.)
M. MISIC & W. FOSTER.
METHOD OF AND APPARATUS FOR ELEVATING LIQUIDS.
No. 555,785. Patented Mar. 3, 1896.
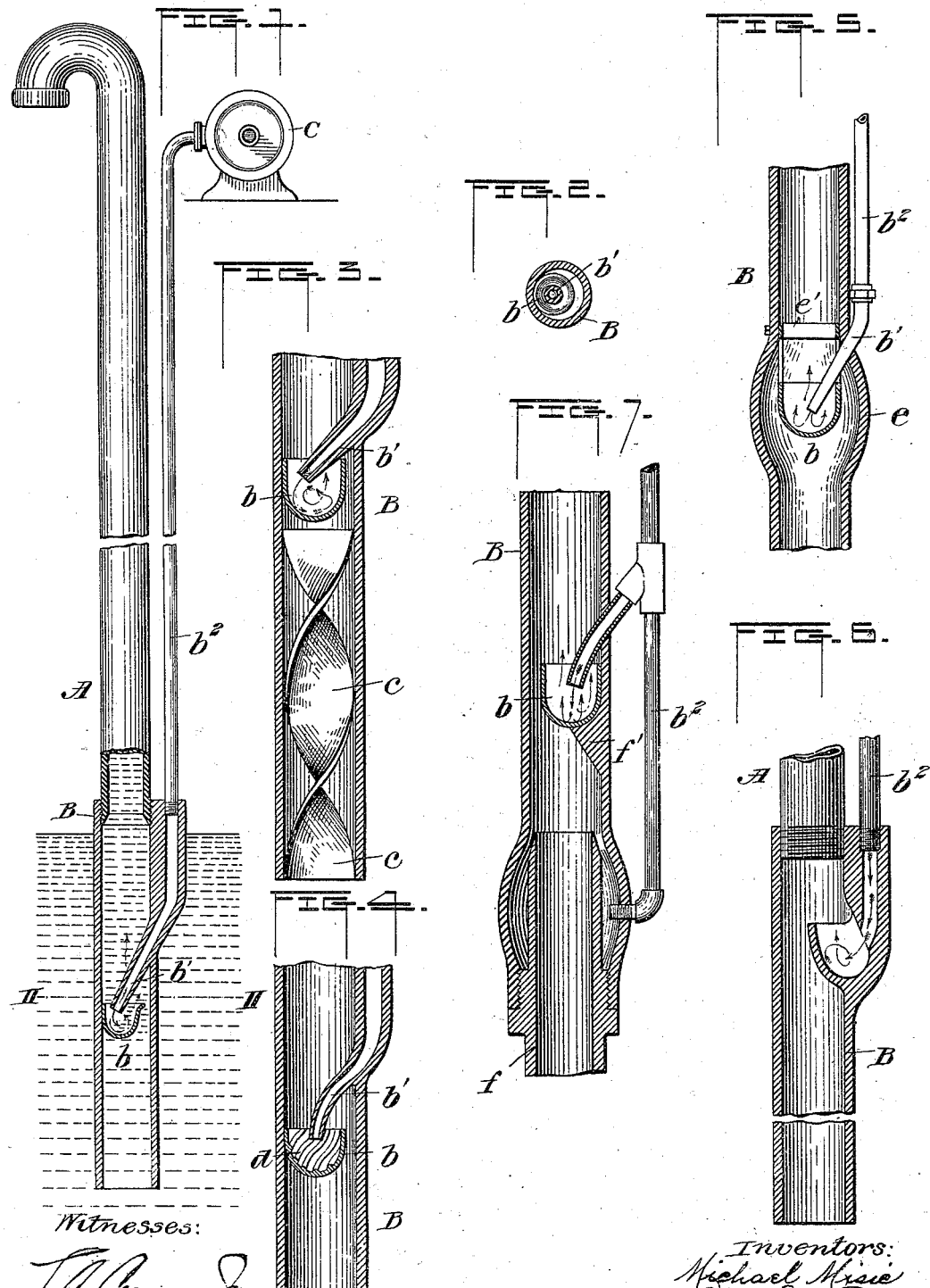

United States Patent Office.

MICHAEL MISIC AND WILLIAM FOSTER, OF BROOKLYN, NEW YORK, ASSIGNORS TO THE FOSTER PUMP WORKS, OF SAME PLACE.

METHOD OF AND APPARATUS FOR ELEVATING LIQUIDS.

SPECIFICATION forming part of Letters Patent No. 555,785, dated March 3, 1896.

Application filed June 26, 1894. Serial No. 515,736. (No model.)

*To all whom it may concern:*

Be it known that we, MICHAEL MISIC and WILLIAM FOSTER, citizens of the United States, residing at Brooklyn, in the county of Kings and State of New York, have invented certain new and useful Improvements in Methods of and Apparatus for Elevating Liquids; and we do hereby declare the following to be a full, clear, and exact description of the invention, such as will enable others skilled in the art to which it appertains to make and use the same.

This invention relates to an apparatus for elevating liquids, but more particularly to raising water by compressed air.

Heretofore in elevating water by compressed air it has been customary to provide a closed receptacle having a connection with a compressed-air conveyer and provided with suitable valves, so that the water may flow into the receptacle and then be forced out of the same by the pressure exerted by the air upon the surface of the water contained therein. Provision has also been made whereby air would be introduced in the form of small globules into a pipe containing a column of water, or to introduce the air in the form of a jet into a rising column of water. Another method consists in continuously introducing air in the form of bubbles into the lower portion of a submerged open-ended pipe in such quantities as to form piston-like pipe-fitting layers at a point above the entrance of the air into the pipe, thereby causing the upward flowing of a series of alternate layers of air and short layers of liquid. Injectors and other methods of a more or less complicated nature have been suggested, but, like the systems referred to, they differ materially from the system employed by us for elevating the liquid.

The primary object of our invention is to improve the systems heretofore in use; and to provide a simple, effective and inexpensive apparatus, whereby the water or other liquid may be elevated to the desired height.

Further objects are to deflect the air, and to give to the air a rotary or whirlwind motion after it escapes from the nozzle of the compressed-air pipe.

With these and other objects in view, our invention consists in the several features as will be more particularly hereinafter described and then defined in the claims at the end of the description.

Referring to the accompanying drawings, forming a part of this specification, Figure 1 is a vertical sectional elevation of the apparatus. Fig. 2 is a sectional plan view on the line II II of Fig. 1; and Figs. 3, 4, 5, 6, and 7 illustrate modified forms of the apparatus.

In carrying out our invention, instead of introducing the air into the water in bubbles in the direction of the flow we have found it very advantageous to introduce the air under pressure into an eduction-pipe in a line approximately opposed to the line of travel of the water and then deflect the air or cause the same to rebound or be thrown suddenly in a reverse direction by an opposing body arranged adjacent to the inlet of the compressed air, and to permit the air to expand freely within said eduction-pipe. This we accomplish in different ways, but we preferably use the construction illustrated in Fig. 1, in which we employ an eduction-pipe A of sufficient length to reach the body of water or other liquid to be elevated. Upon the end of this pipe is an end piece B secured to or formed integrally with said pipe, having its lower end open so that the water may rise therein. Within the end piece and arranged below the surface of the head of water is a deflector $b$, preferably cup-shaped and somewhat less in diameter than the interior of the piece B, to permit the upward flow of the liquid. This deflector has a concaved or rounded bottom and is located adjacent to the mouth of a nozzle $b'$, to which the air is conveyed by the pipe $b^2$ from the air-compressor C or other source of supply. The mouth of the nozzle $b'$ is preferably arranged at an angle to direct the air against one side of the deflector or cup-shaped pocket for the purpose of giving a rotary as well as a rebounding, expanding or spreading action to said air. We thus cause the air to expand freely within the eduction-pipe and to thoroughly commingle with the water to more readily carry the same to the outlet of said pipe.

In operation the air is introduced at a pressure of sixty or seventy pounds, and as the same strikes the side of the deflector *b* the air will rebound suddenly and expand with sufficient force to lift and carry the water with the same as it rises in the eduction-pipe.

In some instances we may desire to impart a rotary motion to the water before the same reaches the deflector for the purpose of making the air commingle more thoroughly with the water. This may be accomplished by providing a spiral *c* below the deflector *b*, as shown in Fig. 3, or spiral ribs may be formed on the exterior surface of the deflector to cause a continuous rotary motion of the water as it ascends in the pipe. The rotary motion of the air may also be given by forming spiral ribs *d* within the interior of the cup-shaped deflector, as shown in Fig. 4.

Figs. 5 and 6 are slightly-modified forms illustrating different arrangement of deflectors. In the former case the deflector is centrally arranged in an enlarged portion *e* of the eduction-pipe and is retained within the pipe by a spider *e'*, to which it is secured by depending arms, or the deflector may be secured directly to the end of the nozzle by a similar spider, if so desired. In Fig. 6 the deflector is arranged in the side of the end piece, so as to offer less obstruction to the upward flow of the liquid.

Where the head of water is not sufficient to give a proper height to the column of water within the pipe, it may in this case and in some other cases be advantageous to employ a positive lift or rise to the water below the deflector. This we may do by any of the well-known methods, or we may employ an injector, such as is disclosed in Fig. 7. In the lower end of the eduction-pipe or end piece B is located an injector-nozzle *f*, adjustably held or formed integrally with the enlarged lower portion of said pipe and provided with a tapering upper end to permit the air to pass between the same and the pipe. The compressed air is admitted to the enlarged portion of the pipe surrounding the body of the injector-nozzle, and as the same escapes between the mouth of said nozzle and the body of the pipe it will cause an upward flow of the water. At a suitable distance above the injector is a deflector of the form heretofore referred to, preferably having a tapering or beveled support *f'* formed integral with the deflector or with the pipe, as shown. In this construction the compressed air is introduced into a rising column of water positively created by means other than the deflected air.

It is obvious that other means than those disclosed may be used if so desired. We therefore wish it understood that we do not confine ourselves to any particular apparatus or any particular combination of the same, or to the use of but one deflector, as more than one deflector may be arranged at intervals in the same pipe without departing from the spirit of our invention.

Having thus fully described our invention, what we claim as new, and desire to secure by Letters Patent of the United States, is—

1. The combination with an eduction-pipe, of a cup-shaped deflector located in said pipe and provided with a concaved or rounded bottom, and a nozzle arranged above said deflector and at an angle thereto, so as to give the air a rotary rebounding action and to permit the same to expand freely within the eduction-pipe, substantially as described.

2. In a water-elevator, the combination with an eduction-pipe, of a deflector located in said pipe adapted to cause the air to rebound or be thrown suddenly in a direction reverse to its introduction and to expand freely within said eduction-pipe, together with means for giving a rotary motion to the water, whereby the air may be made to more thoroughly commingle therewith, substantially as and for the purpose described.

3. The combination with an eduction-pipe, a deflector provided with spiral ribs located in said pipe, and a nozzle located above said deflector for conveying compressed air to the same, substantially as described.

In testimony whereof we affix our signatures in presence of two witnesses.

MICHAEL MISIC.
WILLIAM FOSTER.

Witnesses:
DANIEL BRADLEY,
MARTIN D. BRADLEY.